Oct. 12, 1948.  C. J. SNIDER  2,450,922
OIL REGULATOR TEST STAND

Filed Nov. 26, 1945  6 Sheets-Sheet 1

INVENTOR
CARL J. SNIDER
BY Clade Koontz AND
Frederick W. Ostermann
ATTORNEYS

Oct. 12, 1948.　　　　　　C. J. SNIDER　　　　　　2,450,922
OIL REGULATOR TEST STAND

Filed Nov. 26, 1945　　　　　　　　　　　　　6 Sheets-Sheet 4

INVENTOR
CARL J. SNIDER

BY Clade Konty AND
Frederick W. Cotterman
ATTORNEYS

Oct. 12, 1948.  C. J. SNIDER  2,450,922
OIL REGULATOR TEST STAND
Filed Nov. 26, 1945  6 Sheets-Sheet 5

INVENTOR.
CARL J. SNIDER
BY
ATTORNEYS

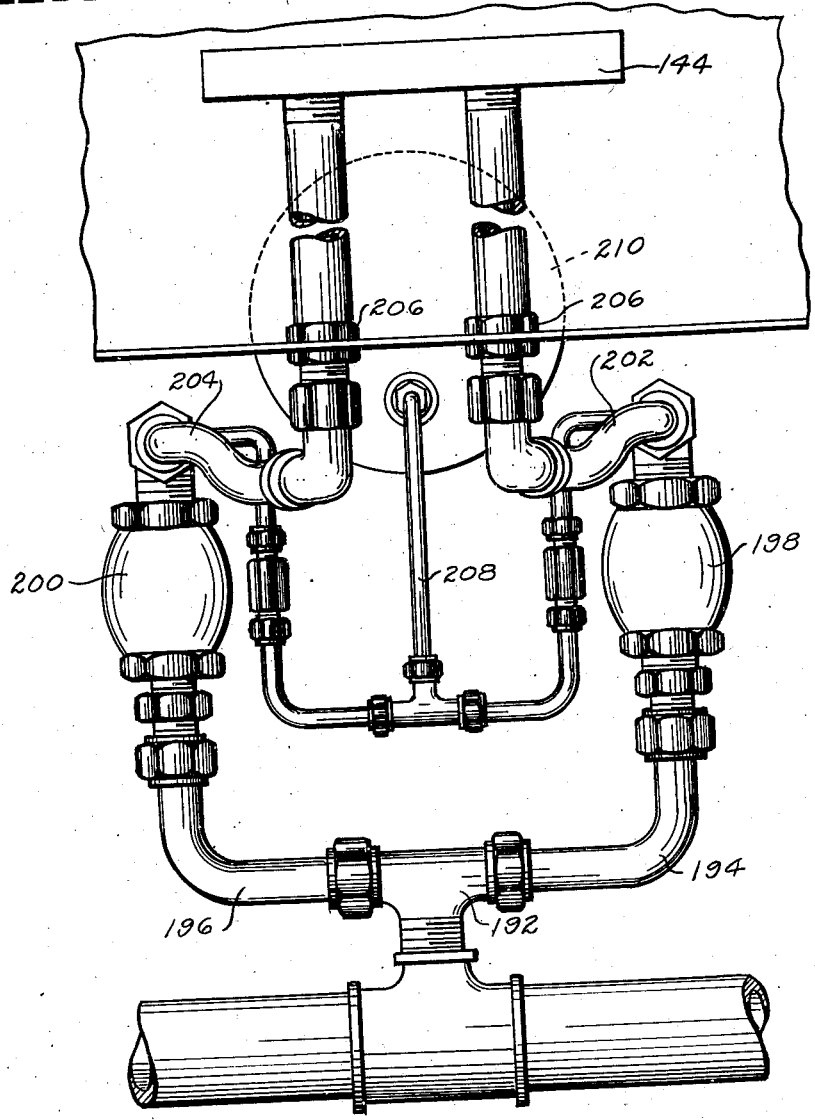

UNITED STATES PATENT OFFICE 2,450,922

OIL REGULATOR TEST STAND

Carl J. Snider, Dayton, Ohio.

Application November 26, 1945, Serial No. 630,966

1 Claim. (Cl. 73—1)

(Granted under the act of March 3, 1883, as amended April 30, 1928; 370 O. G. 757)

The invention described herein may be manufactured and used by or for the Government for governmental purposes without payment to me of any royalty thereon.

This invention relates to testing apparatus, having particular reference to apparatus for testing the operational functions of certain valves such as the oil regulator valves, oil cooler valves, and oil temperature valves used on aircraft, as well as the thermostat elements and electrical elements of these valves.

An object of the invention is to provide apparatus for effecting the above mentioned tests on a plurality of different valves at one and the same time, where each of the valves may require a different test.

Valves of the above type, as employed on aircraft, are required to open or close automatically at a preselected temperature of the oil which is passing therethrough and temporarily pass some or all of the hot oil through a cooler until normal temperature is restored, and are also required to hold pressure in one or both directions, some being provided with visible electrical warning signals different ones of which become operative to indicate to the pilot of an aircraft to what extent the valve is being called upon to maintain the normal temperature.

It is therefore another object of the invention to provide means whereby when a valve is mounted on the apparatus for test, all of the operational functions of the valve may be similated without detaching the valve from the apparatus.

Other objects and advantages will become evident as the invention is described with reference to the drawings, wherein:

Figs. 5 and 6 show the arrangement of some of the piping in detail and to a larger scale.

Like reference characters refer to like parts throughout the several views.

Figure 1:
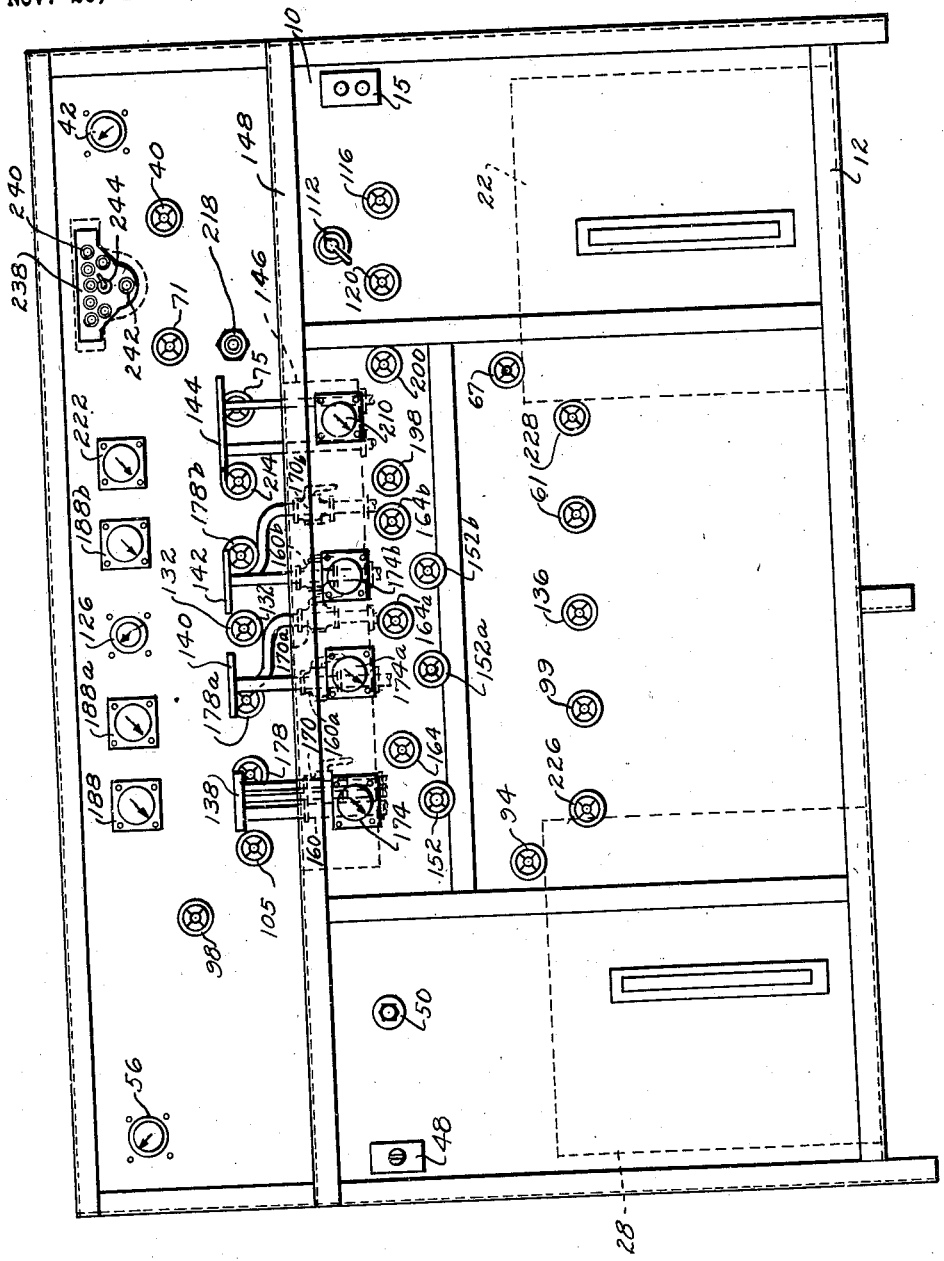
Fig. 1 is a front elevation of my testing apparatus.

Mounted within the cabinet 10 on the frame 12 thereof is an electric motor 14. A cable 11 extends from the main electric switch 13 to the motor (see Fig. 4). A push button switch 15 acts through the cable 17 to start and stop the motor. Drivably conected to the motor 14 are two pumps 16 and 18. The suction pipe 20 of the cold oil pump 16 is connected into a cold oil tank 22 at a point 24 near the bottom, while the suction pipe 26 of the hot oil pump 18 is connected to a hot oil tank 28 at a somewhat higher level as at 30.

Coolant for the cold oil tank 22 is delivered by the pipe 32 which enters the tank at 34 passing through the coil 36 and discharging through the pipe 38. A valve 40 controls the flow of the coolant. A cold oil temperature gauge 42 is electrically connected by a cable 43 into the bottom of the cold oil tank 22 at 44 to indicate the cold oil temperature.

Figure 4:
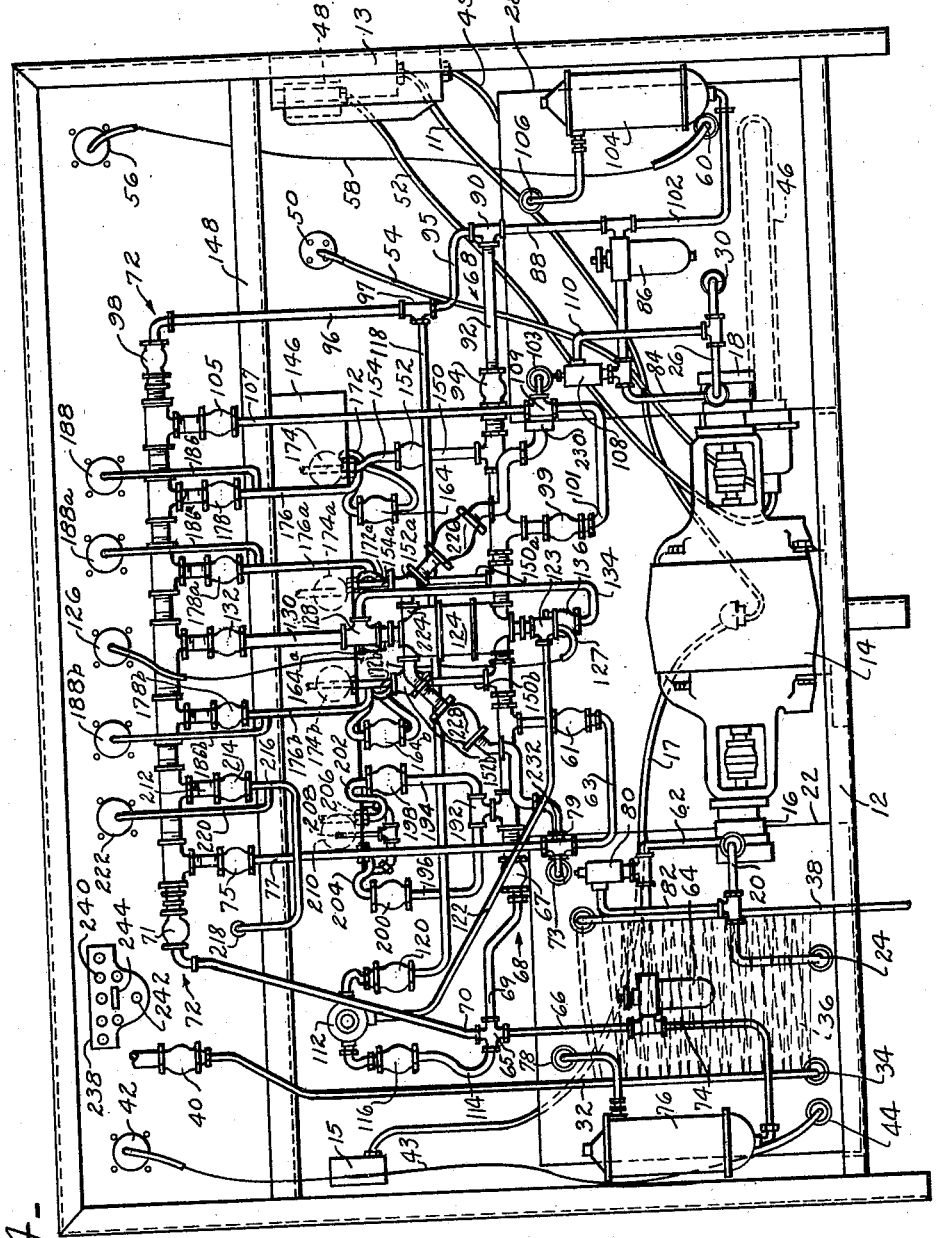
Fig. 4 is a rear elevation.

The electric immersion heating units 46 within the hot oil tank 28 are supplied with current by way of the cable 49 and are controlled by a tumbler switch 48 and a rheostat 50 operating through cables 52 and 54 respectively (see Fig. 4). A hot oil temperature gauge 56 is electrically connected by a cable 58 into the hot oil tank 28 at 60.

The discharge line 62 coming from the cold oil pump 16 discharges through the small filter 64 then divides and goes either upward through pipe 66 to the cross 65 (see Fig. 4), from which a branch pipe 69 extends to the cold oil inlet valve 67 of the lower header 68 and on through pipe 70 to the cold oil inlet valve 71 of the upper header 72, on downward through pipe 74, through the larger cold oil filter 76 and back to the cold oil tank 22 at 78. The upper header 72 may be connected back to the cold oil tank 22 at 73 by means of the valve 75, pipe 77 and T 79. The lower header 68 may also be connected back to the cold oil tank 22 at 73 by means of the valve 61, pipe 63 and T 79. A relief valve 80 returns cold oil through pipe 82 to the suction line 20 when a predetermined discharge pressure is exceeded.

The discharge line 84 coming from the hot oil pump 18 discharges through the small filter 86 then divides and goes either upward through pipe 88 to the T 90, from which a branch pipe 92 extends to the hot oil inlet valve 94 of the lower header 68 and on through pipe 95, T 97 and pipe 96 to the hot oil inlet valve 98 of the upper header 72, or downward through pipe 102, through the larger hot oil filter 104, and back to the hot oil tank 28 at 106. The upper header 72 may be connected back to the hot oil tank 28 at 103 by means of the valve 105, pipe 107 and T 109. The lower header 68 may also be connected back to the hot oil tank 28 at 103 by means of the valve 99, pipe 101 and T 109. A relief valve 108 returns hot oil through pipe 110 and, by way of the suction line 26, returns it to the tank 28 at 30 when a predetermined discharge pressure is exceeded.

By means of the structure thus far described, cold oil may be delivered to one end and hot oil to the other end of either the lower header 68 or the upper header 72. When oil is required to be at a temperature which is between the temperature of the cold oil and that of the hot oil, a mixing valve 112 is employed, cold oil being brought to the mixing valve from the cross 65 through a pipe 114 and globe valve 116, and hot oil being brought to the mixing valve from the T 97 through a pipe 118 and globe valve 120. The discharge side of the mixing valve 112 empties by way of the pipe 122 and T 123 into the bottom of a small accumulator 124. A temperature gauge 126 has its operating cable 127 connected through the T 123 into the accumulator 124, whereby the temperature of the oil mixture in the accumulator is indicated.

Flow of hot oil mixture from the top of the accumulator 124 passes into the T 128, then divides, going up by way of the pipe 130 and valve 132 to the upper header 72, and going down through the pipe 134 and valve 136 to the lower header 68.

The adapter pads or testing fixtures 138, 140, 142 and 144 to which the valves to be tested are secured, are mounted within the boundary of, and somewhat above, the sink 146, which hangs from the working surface 148 of the cabinet 10. The upper surface of the pads are provided with openings or slots as the case may require, and oil at any desired pressure and any desired temperature may be brought to the pads from the hot or cold tank directly by way of the upper or lower header, or, first through the mixing valve then through the upper or lower header, and passed through the valve in either direction as the test may require with one clamping of the valve in position on the pad.

Figure 2:
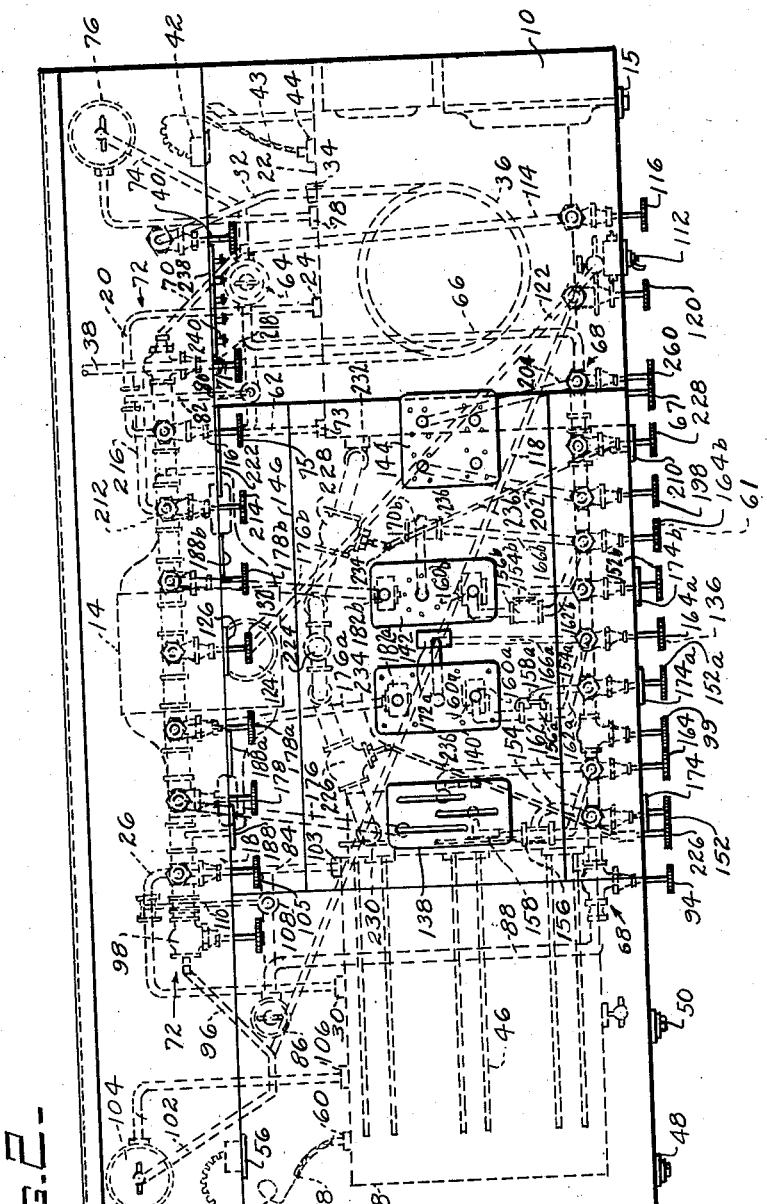
Fig. 2 is a top plan view.

Pads 138, 140 and 142 each have three openings for connection to the several types of valves which are to be tested. Pad 138 differs only from pads 140 and 142 in that the openings in pad 138 are staggered while those in pads 140 and 142 are in line. A further difference is that the openings in pad 138 terminate in elongated slots at the surface of the pad (see Fig. 2). The manner in which the hot or cold oil, or the mixture of hot and cold oil, is brought from the upper or lower header to the upper or test surface of the pads 138, 140 and 142 is shown to an enlarged scale in Fig. 5.

Figure 5:
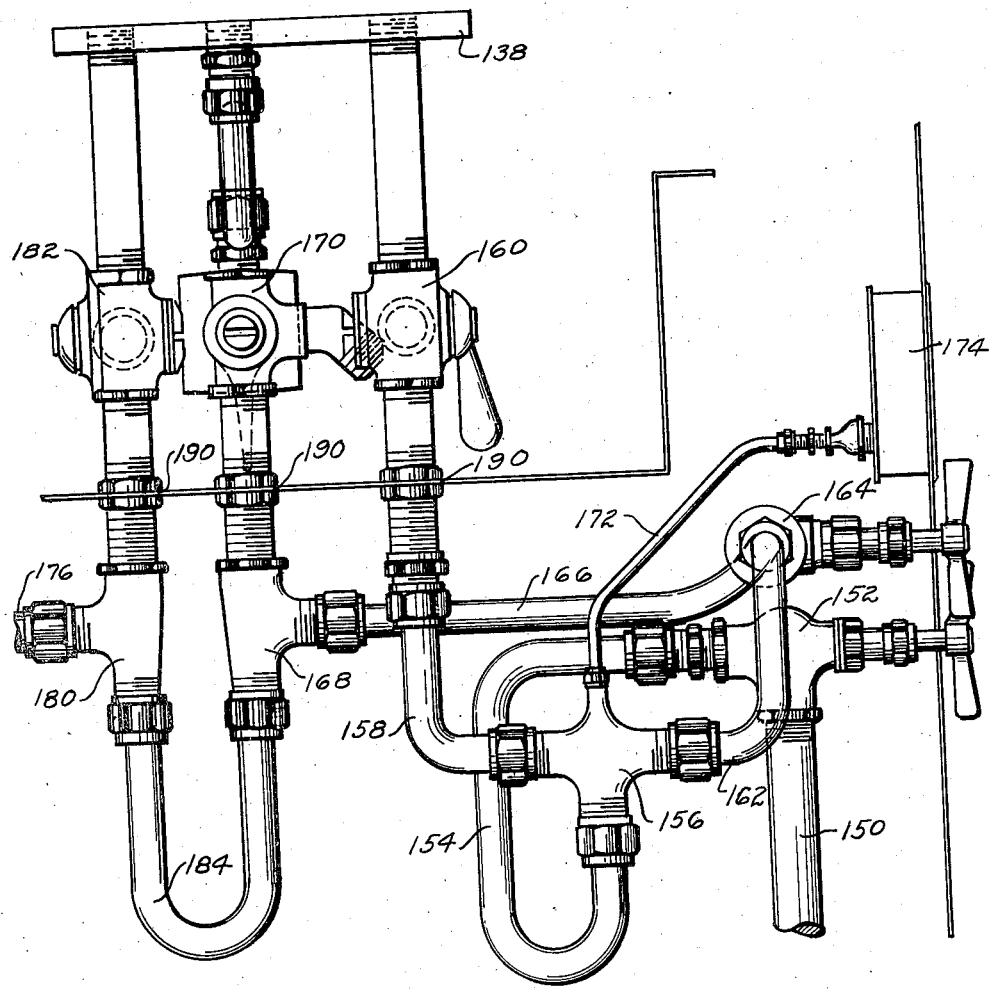

Referring more particularly to Fig. 5, a pipe 150 delivers oil from the lower header 68 through the valve 152, pipe 154, cross 156, pipe 158, and three-way valve 160 to the forward opening of the pad 138. A pipe 162 receives oil from the cross 156 and conveys it through the valve 164, pipe 166, T 168, and three-way valve 170 to the middle opening in the pad 138. A small pipe 172 extends from the cross 156 to a pressure gauge 174. A pipe 176 extends from the upper header 72 through a valve 178 to the T 180, then through a three-way valve 182 to the rear opening in the pad 138. The three-way valves 160, 170 and 182 are adapted, in one position, to direct flow to the face of the pad, in another position to direct flow into the sink, and in a third position, to stop flow altogether. A pipe 184 connects the T 168 to the T 180. A small pipe 186 connects the pipe 176 to a pressure gauge 188. Sealing means 190 are provided where the pipes pass through the bottom of the sink.

The valve and piping connections described with reference to pad 138 apply equally to pads 140 and 142, where the same reference characters may be used on the drawing but with sub letters "a" and "b."

Pad 144 is adapted for testing the thermostat elements of the oil regulator valves, oil cooler valves etc. and is provided with four openings, oil pressure connections being made to the two rear openings, the two front openings being provided for returning the oil to the sink after a test has been made.

Referring more particularly to Fig. 6, there is connected into the lower header 68 a T 192 from which oil is taken through pipes 194 and 196 and valves 198 and 200 and pipes 202 and 204 which extend through the bottom of the sink as at 206 to the pad 144. A smaller pipe 208 connects both pipes 202 and 204 to a pressure gauge 210. No connection is made from the upper header 72 to the pad 144.

The four adapter pads above described will accommodate substantially all oil regulator valves, oil cooler valves, thermostats for same, etc. currently used on aircraft. Some of the valves to be tested, however, may include a side, top, or end connection to which oil must be conveyed in making a proper test. To accommodate such valves the upper header is drawn upon at 212, oil being taken through the valve 214 and pipe 216 to a fitting 218 on the face of the upper instrument panel. A smaller pipe 220 extends to a pressure gauge 222 for determining the pressure in pipe 216.

Figure 3:
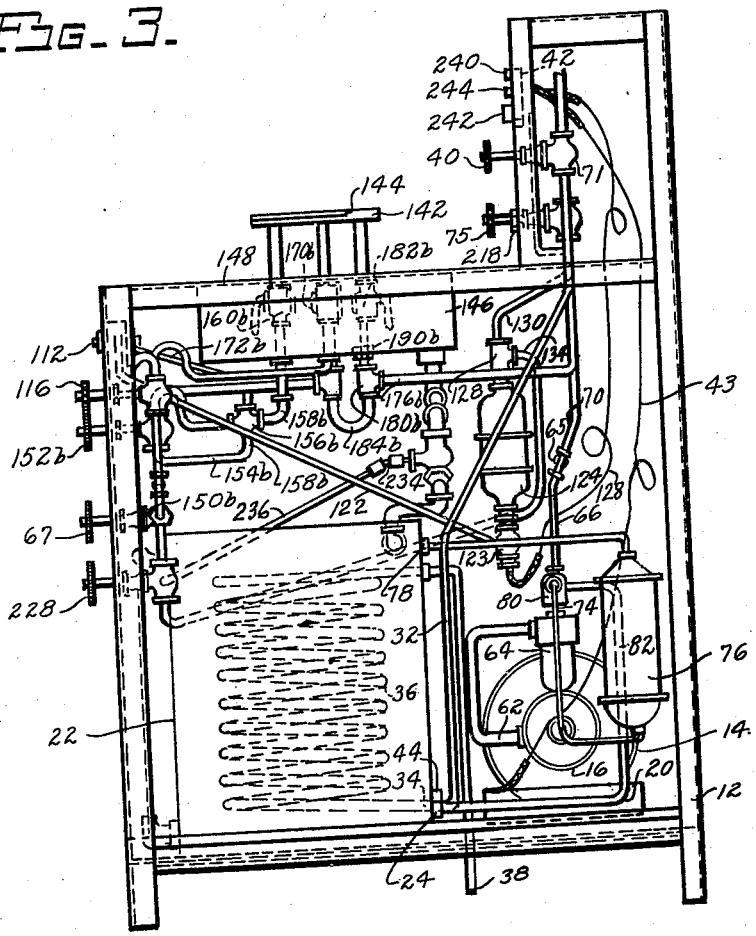
Fig. 3 is an end elevation viewed from the right.

When tests are being made in which the three-way valves 160a, 170a or 182a are set to direct oil into the sink 146, means for connecting the sink back to the tanks 22 and 28 are provided. For this purpose connection is made from the bottom of the sink to a T 224, thence through valves 226 and 228 back to the hot oil tank at 230 and to the cold oil tank at 232. Valves 226 and 228 are operated through universal joints 234 and rods 236 (see Figs. 2 and 3).

Certain of the valves which are to be tested, progressively open one after the other a series of flow passages, each passage larger than the one next previous, as the oil temperature increases, and coincidentally make a corresponding series of electrical contacts so arranged that indicating means may be attached thereto to show which port is currently open. To test the electrical connecting means on this type of valve, coincidentally with the pressure and temperature tests, a signalling panel 238 is provided with a series of electric signal lights to simulate a portion of the control panel on an aircraft. A multiple plug-in receptacle 242 corresponds to a plug-in receptacle on the valve being tested. A transformer (not shown) may preferably be used to reduce the voltage, and a switch 244 is provided to connect to a source of current supply. A multiple cable having suitable plug-in terminals is provided (cable not shown) to connect the two receptacles together, whereby the tester may determine which opening in the valve is being used, by observing which light is lit. Obviously, if, in the operation of aircraft, the largest opening is continuously being required in order to keep the oil at normal temperature, this may indicate that some abnormal condition is causing overheating of the oil in the system. Tests may be made on this type of valve simulating actual operating condition.

Having described my invention,
I claim:

A stand for testing oil regulator valves and the like, which comprises, in combination, a cold oil pump, a hot oil pump, power means for driving both pumps, a relief valve for each pump, a cold oil tank in communication with the suction side of the cold oil pump, a hot oil tank in communication with the suction side of the hot oil pump, a cooling coil in said cold oil tank, valve means to control flow of a coolant through said cooling coil, electric heating means in said hot oil tank, means to control flow of electric current through said electric heating means, an oil temperature gauge for each tank, an upper header, a lower header, a temperature gauge for each header, valve controlled header supply passageways connecting both headers to the cold oil pump, valve controlled header supply passageways connecting both headers to the hot oil pump, valve controlled header return passageways connecting both headers to the cold oil tank, valve controlled header return passageways connecting both headers to the hot oil tank, a mixing valve having selectively controlled inlet passageways, one from each pump, and a discharge passageway having a valve controlled branch extending to each header, an accumulator in said discharge passageway, a gauge connected to indicate oil temperature within said accumulator, a sink, adapter pads within the boundary of and above said sink, each said pad having three test openings for connection to corresponding openings in the valve to be tested, a valve controlled passageway connecting the lower header to the front test opening, a valve controlled passageway connecting the lower header to the middle test opening, a valve controlled passageway connecting the upper header to the rear test opening, a three-way valve in the passageways adjacent the test openings, said three-way valves each being adapted to direct oil either to the test opening, to the sink, or to shut off the oil from the test opening, and selectively controllable valves for draining the oil in the sink back to one or the other or both of said tanks.

CARL J. SNIDER.

REFERENCES CITED

The following references are of record in the file of this patent:

UNITED STATES PATENTS

| Number | Name | Date |
| --- | --- | --- |
| 2,103,305 | Thomas | Dec. 28, 1937 |
| 2,310,974 | Lumm | Feb. 16, 1943 |
| 2,364,709 | Greer | Dec. 12, 1944 |
| 2,405,895 | Lodwig | Aug. 13, 1946 |
| 2,406,080 | Laird | Aug. 20, 1946 |